US012769801B2

(12) United States Patent
Phetsarath et al.

(10) Patent No.: US 12,769,801 B2
(45) Date of Patent: Oct. 20, 2026

(54) SYSTEM FOR RECOMMENDING ITEMS BASED ON A SEARCH QUERY

(71) Applicant: eBay Inc., San Jose, CA (US)

(72) Inventors: Sourigna Phetsarath, Brooklyn, NY (US); Akshay Agarwal, Morristown, NJ (US); Prathamesh Jagtap, Edison, NJ (US); Nimish Ronghe, Jersey City, NJ (US)

(73) Assignee: eBay Inc., San Jose, CA (US)

(*) Notice: Subject to any disclaimer, the term of this patent is extended or adjusted under 35 U.S.C. 154(b) by 0 days.

(21) Appl. No.: 18/999,842

(22) Filed: Dec. 23, 2024

(65) Prior Publication Data

US 2026/0178673 A1 Jun. 25, 2026

(51) Int. Cl.
*G06F 16/9535* (2019.01)
*G06F 16/2457* (2019.01)

(52) U.S. Cl.
CPC .... *G06F 16/9535* (2019.01); *G06F 16/24578* (2019.01)

(58) Field of Classification Search
CPC ....................... G06F 16/9535; G06F 16/24578
See application file for complete search history.

(56) References Cited

U.S. PATENT DOCUMENTS 8,548,876 B1 * 10/2013 Fox ....................... G06Q 30/00 705/14.1
10,009,438 B2 6/2018 Das
2020/0218750 A1 * 7/2020 Liu ....................... G06F 16/358
2024/0020321 A1 * 1/2024 Mosenia ............. G06F 16/9536
2024/0281342 A1 8/2024 Bedadala et al.

OTHER PUBLICATIONS

Chen, Tianqi, "XGBoost A Scalable Tree Boosting System", In Proceedings ofthe 22nd ACM SIGKDD Conference on Knowledge Discovew and Data Mining, pp. 785-794, [Online] Retrieved from the internet https arxiv.org abs1603.02754v3, Aug. 13, 2016, 13 pgs.
Lee, Sungjin, "FleXFS A Flexible Flash File System for MLC NAND Flash Memory", Seoul National University, KoreaSamsung Electronics, Korea, Jun. 2009, 14 pgs.

(Continued)

*Primary Examiner* — Apu M Mofiz
*Assistant Examiner* — Oscar Wehovz
(74) *Attorney, Agent, or Firm* — Shook, Hardy & Bacon L.L.P./eBay Inc.

(57) ABSTRACT

A search query for an item having at least one object is received. An item identification (id) for the item is then determined using the at least one object. A first database having item identification (ids) associated with object types is accessed. Using the item id, a determination is made whether the first database has an object type that corresponds to the item id. A second database that has categories corresponding to object types is accessed to determine a category that corresponds to the object type. A third database having project names that correspond to the object type and the category is accessed to determine a project name associated with the item. A list of recommended items based on the project name is generated and presented to a user.

20 Claims, 7 Drawing Sheets

(56) References Cited

OTHER PUBLICATIONS

Trotman, Andrew, "The architecture of ebay search", Proceedings of the SIGIR 2017 Workshop On eCommerce co-located with the 40th International ACM SIGIR Conference on Research and Development in Information Retrieval, eCOM@SIGIR 2017, vol. 2311 of CEUR Workshop Proceedings, CEUR-WS.org, Aug. 11, 2017, 7 pgs.

Xue, Chen, "How eBay Created A Language Model Eith Three Billion Item Titles", [Online]. Retrieved from the Internet https innovation.ebayinc.com stories how-ebay-created-a-language-model-with-three-billion-item-titles , 2023, 9 pgs.

* cited by examiner

Headlight: Lens 400

Honda™ Civic™ Black Headlight Headlamp Driver SIDE LH Left 412

Honda™ Civic™ Black Headlight Headlamp Passenger SIDE RH Right 414

Chevy™ GMC™ C/K 1500 2500 3500 LED DRL Chrome Clear Lens Headlights 416

Headlight: Housing 402

Headlights Left & Right Pair Set Fit For Toyota Tacoma™ Assembly Black 418

Ford Mustang™ Black Housing Headlight Replacement Lamps Pair 420

Honda™ Civic™ Sedan Coupe Chrome Housing Clear Corner Headlight Headlamp 422

Headlight: Bulb 404

2x D1S D1R Innovited™ Headlight Light Replacement Bulbs 5000K 6000K 8000K 10000K 424

4x LED Headlight Bulbs High/Low Beam + Fog Light 6500K For Ram™ 1500 426

Toyota™ Camry™ 2007-2014 Combo Led Headlight High Low Beam + Fog Light Bulbs 428

Bulb: Halogen 406

12 Bulbs GE™ 66246 29W (40W Replacement) Soft White Medium Base Light Bulbs Bulk 430

10 Pack - 20 Watt Halogen G8 120V T4 Light Bulbs G8 Base Bi-Pin 120 Volt JCD Type 432

10 Pack MR16 12V 20W 20watts Halogen Lighting Bulb New 434

Bulb: LED 408

H7 LED Headlight Bulbs Kit High / Low Beam 6500K Super Bright White Lights 2x 436

8FT Integrated LED Tube Light Bulbs 144W 6500K LED Shop Light Fixture 8 Foot 438

GE™ LED Light Bulbs, 60 Watt, Daylight, A19 Bulbs, Medium Base, Dimmable (12 Pack) 440

Bulb: Xenon 410

Aliens™ Hid Xenon Headlight Conversion Kit 9005 9006 H1 H3 H4 H13 9005 9006 9007 442

9005 9006 Xenon Halogen Super White LED Combo Headlight Bulbs High Low Beam Kit 444

2x D2S D2R Factory OEM HID Xenon Replacement Headlight Bulbs 446

FIG. 4

500

| Type and Category | Project Name | Items |
| --- | --- | --- |
| Headlight: Lens 400 | 502 Headlight Restoration | Headlight Restoration Kit<br>UV Protective Clear Coat<br>Sanding Discs (510) |
| | 504 Headlight Customization | Custom Headlight Housing<br>LED Halo Rings<br>Tinted Headlight Film (512) |
| | 506 Headlight Replacement | Replacement Headlight Assembly<br>Headlight Bulb<br>Headlight Wiring Harness (514) |
| | 508 Vehicle Maintenance | Headlight Alignment Tool<br>Headlight Cleaning Solution<br>Microfiber Cloth (516) |

FIG. 5

500 510

| Project Name | Items | Explanation |
| --- | --- | --- |
| Headlight Restoration 502 | 606 Headlight Restoration Kit | It is a kit containing various tools and materials needed to clean, polish, and restore the clarity of the headlight lens (600) |
| | 608 UV Protective Clear Coat | It is a coating applied to the headlight lens after restoration to protect it from UV damage and maintain its clarity. (602) |
| | 610 Sanding Discs | It is a set of abrasive discs used to remove the oxidized layer and scratches from the headlight lens during the restoration process. (604) |

FIG. 6

SYSTEM FOR RECOMMENDING ITEMS BASED ON A SEARCH QUERY

TECHNICAL FIELD

Examples of the present disclosure relate generally to systems for recommending items based on an input and, more particularly, but not by way of limitation, to a system that determines project names associated with an input and recommends items based on the project names.

BACKGROUND

Typically, when a user searches for a specific item related to a task the user is trying to complete, the user may not be aware that other items are available to complete the task. Moreover, when the user becomes aware of the items that are available to the user to complete the task, the user will have to undertake further searching for the item. This can increase the time associated with completing the task. Thus, if a user is replacing a halogen lightbulb for their automobile, the user may not be aware that LED or Xenon lightbulbs are also available for their vehicle. Furthermore, even if the user is aware of the availability of LED or Xenon lightbulbs when conducting a search for halogen lightbulbs, the user will have to individually search for the LED and Xenon lightbulbs in addition to the search for halogen lightbulbs.

SUMMARY

Examples relate to a system and method that recommends items to a user based on a search query received from a user. When the search query for an item is received, a large language learning model (LLM) can determine an item identification (id) based on objects within the search query, determine an object type with the item id, and then determine a category using the object type. The system can access a first database to ascertain the object type using the item id. Using the object type or the item category, the system can then access a second database to determine a category using the object type. Using the object type and the category, the system can determine a project name by accessing a third database. When the system determines the project name, the system can recommend additional items to the user based on the project name.

The item id and the object types can be respectively stored at the first and second databases during a background process agnostic to receiving the search query. The background process can occur when second users post the items on a networked platform. The LLM can extract item ids and use the item id to determine object types from data associated with the items when the items are posted on the networked platform. The background process can also include searching additional databases having items that are already posted on the networked platform but do not have an object type for data associated with the items that were previously posted. The LLM can extract item ids and determine object types from data associated with items that were already posted on the networked platform.

In scenarios where an object type is not at the second database, a k-nearest neighbor algorithm (KNN) can be employed to determine an object type. Using KNN, KNN objects can be gathered and then embeddings associated with each KNN object can be determined where the embeddings can correlate to vectors for each KNN object. An average vector can then be determined which can be used for a centroid of a cluster of KNN objects. The centroid can be associated with an object, where the centroid object can be used to access the second database. KNN can also be used in scenarios where a category is not at the third database.

The project names can be stored at the third database prior to receiving the search query for the item from the user. The project name can have a list of related types that can a refer to a list of items associated with the project name. During a training phase, the related types can be generated. Also, during the training phase, the LLM can provide an explanation of the related types that indicates how the list of items are related to the project name. If a determination is made that the explanation, the list of items, or both are incorrect, the LLM can be provided with training data that relates to the proper explanation, the proper list of items, or both. Moreover, at a later time, the LLM can be provided with further training data that can relate to further project names and further lists of items that can be associated with the project name in order to update the LLM such that the LLM can change over time.

BRIEF DESCRIPTION OF THE DRAWINGS

Various ones of the appended drawings merely illustrate examples of the present disclosure and should not be considered as limiting its scope.

FIG. 4 illustrates key pairs based on various titles for items that can be for sale via the e-commerce server of FIG. 1, according to some examples.

FIG. 5 is a table showing project names and items associated with the project names for a key pair, according to some examples.

FIG. 6 is a table providing explanations for the items shown in FIG. 5, according to some examples.

DETAILED DESCRIPTION

Figure 1:
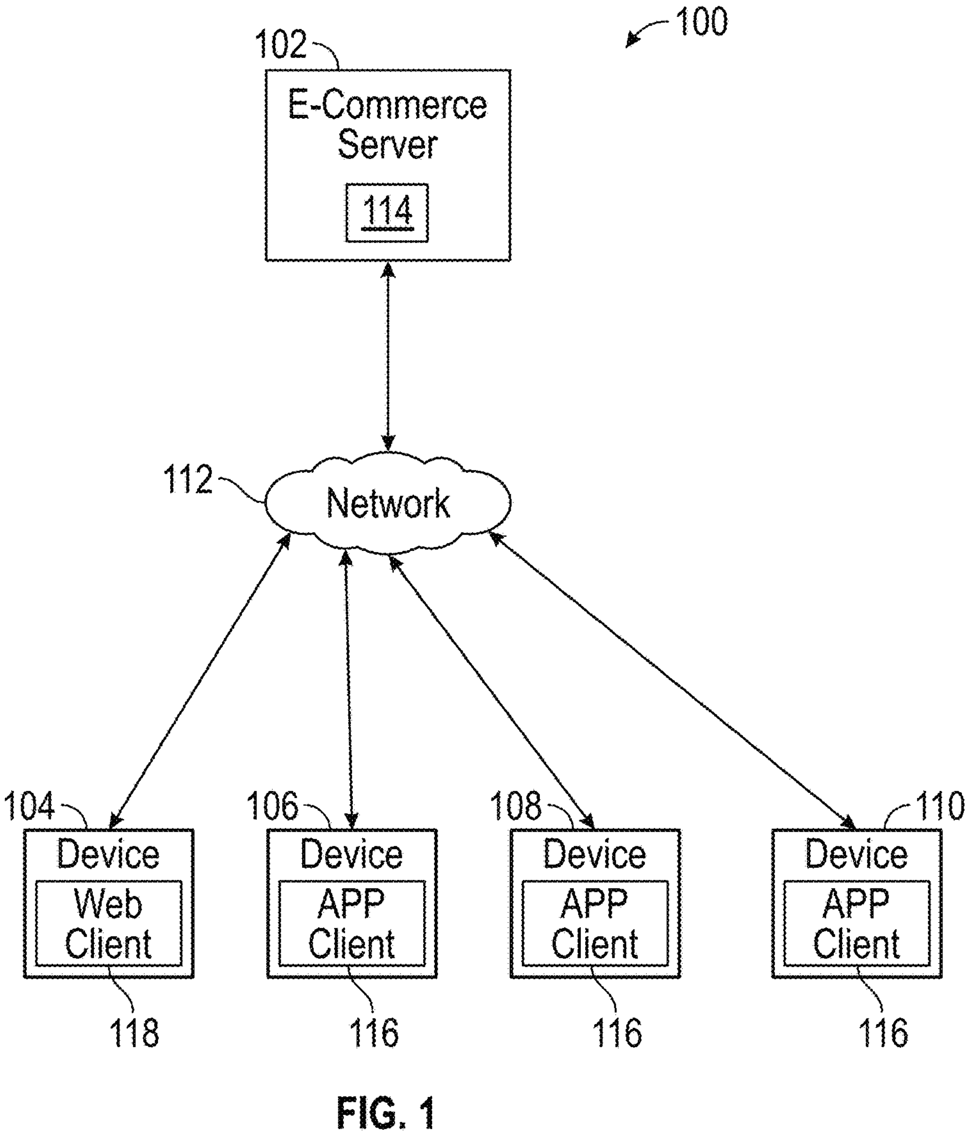
FIG. 1 is a network diagram illustrating a network environment suitable for determining project names for items that are listed on an e-commerce server where items can be recommended based on the project names when a search request is received at the e-commerce server from a user device, according to some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Examples relate to a system and method that recommends items to a user based on a search query received from a user. When the search query for an item is received, a large language model (LLM) can determine an item identification (id) based on objects within the search query, determine an object type with the item id, and then determine a category using the object type. The system can access a first database to ascertain the object type using the item id. Using the object type or the item category, the system can then access a second database to determine a category using the object type. Using the object type and the category, the system can determine a project name by accessing a third database. When the system determines the project name, the system can recommend additional items to the user based on the project name.

In examples, first training data can be provided to the language learning model to fine tune, which can encompass training the language learning model to determine item ids and project names based on objects in a search request at a first time period. Furthermore, at a second time period after the first time period, the language learning model can be provided second training data. The second training data can be provided to the language learning model based on the items recommended by the language learning model when the language learning model returns results based on the search query. In particular, the second training data can be provided to improve the results returned by the language learning model along with the items recommended by the language learning model. The language learning model can change over time when the language learning model is retrained with the second training data at the second time period.

The language learning model can include a knowledge base having contextual data sets that can be accessed to determine language that should be parsed where the parsed language can correspond to item ids. First training data can be provided to the language learning model to train the language learning model how to parse the language and then how to correspond the parsed language to item ids. The first training data can also include data sets that show how to correspond the item ids to object types using a look up table, how to correspond object types to categories using a look up table, and how to correspond the object types and the categories to a look up table to determine project names and items associated with each of the project names.

Second training data can be provided at a later time. The second training data be provided to the language learning model to train the language learning model how to parse the language and then how to correspond the parsed language to item ids in a manner that differs from the first training data based on results provided from the language learning model using the first training data. The second training data can also include data sets that show how to correspond the item ids to object types using a look up table, how to correspond object types to categories using a look up table, and how to correspond the object types and the categories to a look up table to determine project names and items associated with each of the project names, again in a manner that differs from the first training data based on results provided from the language learning model using the first training data The language learning model can include any type of deep learning algorithm that can perform various natural language processing tasks, such as a large language model. Examples can include Chat Generative Pre-trained Transformer (ChatGPT), Pathways Language Model (PaLM), Large Language Model Meta AI (LLaMA), BigScience Large Open-science Open-access Multilingual Language Model (BLOOM), or the like. Further examples of language learning models that can be used can include Classification and Regression Training, gradient boosted machines, glmnet, randomForest, SciPy, XGBoost, and various neural networks, such as a Feed-Forward neural network, a radial basis function neural network, a multilayer perceptron neural network, a convolutional neural network, a recurrent neural network, and a modular neural network.

The language learning model can use deep learning to output results having recommended items. The language learning model can be provided ground rules and then be provided data, such as previous feedback provided from users. In an unsupervised format, the language learning model can train to develop an understanding of the relationships objects in the item data having a key: value format and nodes in the hierarchical nodal structure. The language learning model can include an attention model. The training data can be tagged based on a desired categorization of the first item associated with an input, such as a title for the first item.

Examples address technical problems associated with a system being able to parse objects within a string of data received from a requestor, determine a relationship of the parsed objects to stored data at the system, and then provide the stored data to the requestor. Typically, when a string of data is received, while the string of data can be parsed, computing systems lack the ability to use the parsed data to determine multi-level relationships between the parsed data and data stored at the system.

Examples provide a technical solution to this technical problem by implementing a system that can readily parse objects within a data string and then determine multi-level relationships the parsed data can have with data stored on the system. The system can first determine an object type using parsed data, which can be a first level relationship. The system can then determine a relationship between the object type and a category, which can be a second level relationship. Using the first and second relationship levels, the system can determine third level relationships the object types and the categories have with third level data stored at the system. This can be accomplished by teaching the system how to make these relationship connections with training data. Based on the determined multi-level relationships, objects related to the data string can be provided.

Moreover, examples improve the functioning and performance of a computing device. In particular, in the past, a computing device was incapable of determining actions associated with a particular object. The actions can be related to how the object can be implemented. Therefore, when a computing device received an object while being unaware of actions associated with the object, the computing device was incapable of accessing additional sources, such as databases, having additional objects associated with the action. Furthermore, the computing device was incapable of presenting the additional objects, thereby stifling the performance of the computing device with regards to accessing additional sources. Examples improve the functioning and performance of computing devices by discussing how a computing device can determine an action associated with a particular object. Discussion is also made regarding how a computing device can access additional sources to determine additional objects that are associated with the particular object and presenting the additional objects.

Now making reference to the Figures, and more specifically, FIG. 1, a network environment 100 that facilitates the buying and selling of items is shown, according to some examples. The network environment 100 can include an e-commerce server 102, along with devices 104-110 communicatively coupled to each other via a network 112. The e-commerce server 102 can be a network platform and further provide functionality that enables a buyer to purchase, submit an offer, and/or bid on an item listed for sale. For example, the e-commerce server 102 can provide user interface elements (e.g., button, text fields, etc.) that a buyer may use to select to purchase an item, place a bid, etc., as well as provide their financial (e.g., credit card number, bank account number) and personal information (e.g., shipping address, billing address, etc.) to complete the purchase. To view listings and/or purchase/bid on listed items, a buyer can create a user account with the e-commerce server 102.

To list an item for sale on the online marketplace, a seller can create a user account with the e-commerce server 102. The user account may include personal information (e.g., name, address, email address, phone number, etc.) and financial information (e.g., credit card information, bank account information, etc.) associated with the seller. Once the seller has created a user account, the seller can then use their user account to utilize the functionality of the e-commerce server 102, including listing an item for sale. The e-commerce server 102 can include a language learning model 114, which, as will be discussed in greater detail below, can be used to recommend items to a user based on a search query received from a user. The language learning model 114 can have the features described herein.

The devices 104-110 can interact with the e-commerce server 102 using an app client 116 or a web client 118. The web client 118 can be a web browser, which allows for communication between a device, such as the device 104, and a web server, which can be the e-commerce server 102. The app client 116 can be a standalone application that runs on one of the devices 106-110 and communicates with a remote server to employ the services on the remote server, such as Bluetooth™ client application, or the like. The web client 118 can allow a user to make a request and then show a result of the request. The e-commerce server 102 and the devices 104-110 can each be implemented in a computer system, in whole or in part, as described below with respect to FIGS. 8 and 9. The e-commerce server 102 can provide an electronic commerce application to other machines (e.g., the devices 104-110) via the network 112. The electronic commerce application may provide a way for users to buy and sell items directly to each other, to buy from and sell to the electronic commerce application provider, or both.

Figure 2:
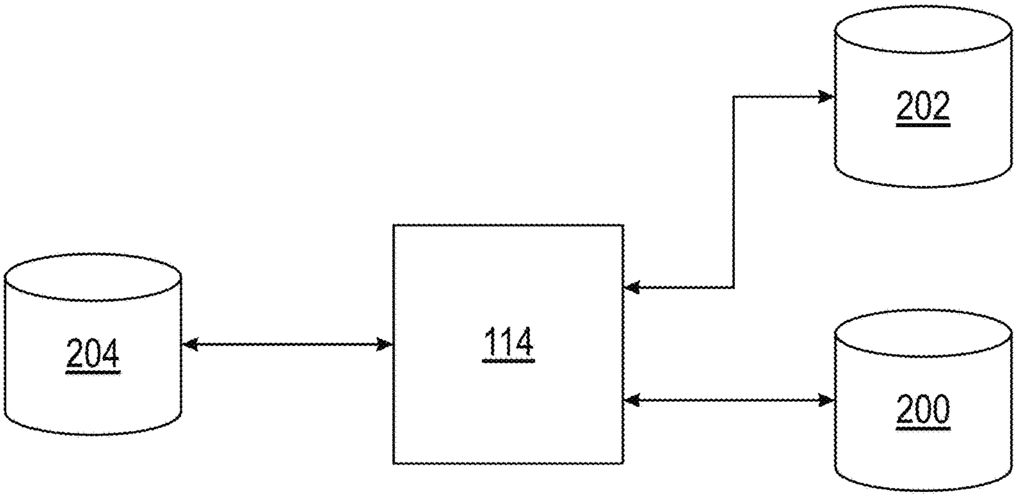
FIG. 2 is a system schematic that shows the interaction of a language learning model of FIG. 1 with various databases, according to some examples.

Now making reference to FIG. 2, the language learning model 114 can interact with databases 200-204 to recommend items to a user based on a search query received from a user. The database 200 can include a cache having item identifiers (item ids) that can be matched to an object type. Item ids can be determined from an object associated with an item. The object can relate to metadata associated with the item. The items ids that match the object types can be stored in a look-up table that can be searched when a listing is received or a search query is received, as will be discussed further on.

The database 202 can have a cache that includes a look-up table that matches object types to categories. As will be discussed further on, armed with an object type determined at the database 200, the language learning model 114 can search for categories associated with the object type at the cache located at the database 202.

The database 204 can correlate to a project cache, which can store project names that are associated with various object types and various categories. When project names are associated with object types and categories, the language learning model 114 can implement storage of the project names at the database 204. The items relating to the project names along with an explanation of the projects associated with the project names can also be stored at the database 204. Moreover, a listing of items associated with performing projects associated with the project names can be stored at the database 204.

Figure 3:
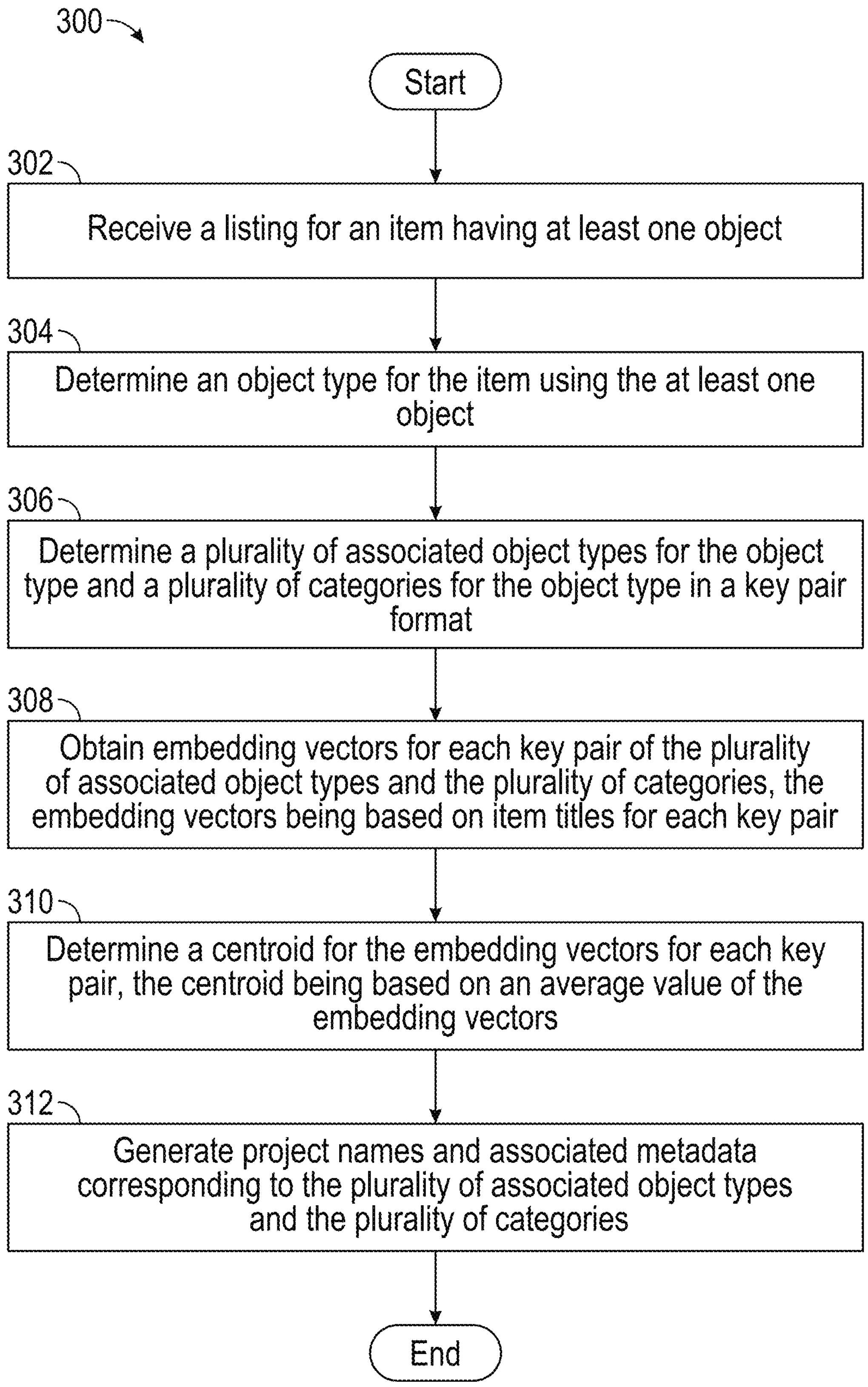
FIG. 3 shows a method that associates project names with an item based on object types and categories, according to some examples.

An algorithm architecture across the databases 200-204 can be used in conjunction with the language learning model 114 to associate project names with an item. For example, now making reference to FIG. 3, a method 300 for associating project names with an item is shown. The method 300 can be performed as a background process and can therefore be agnostic to receiving a search query relating to an item for which project names have been associated. To further illustrate, the method 300 can be performed at a time $T_1$ for a first item and then at a time $T_2$, which is after the time $T_1$, a search query can be received for an item for which a project name was generated at the time $T_1$.

Figure 7:
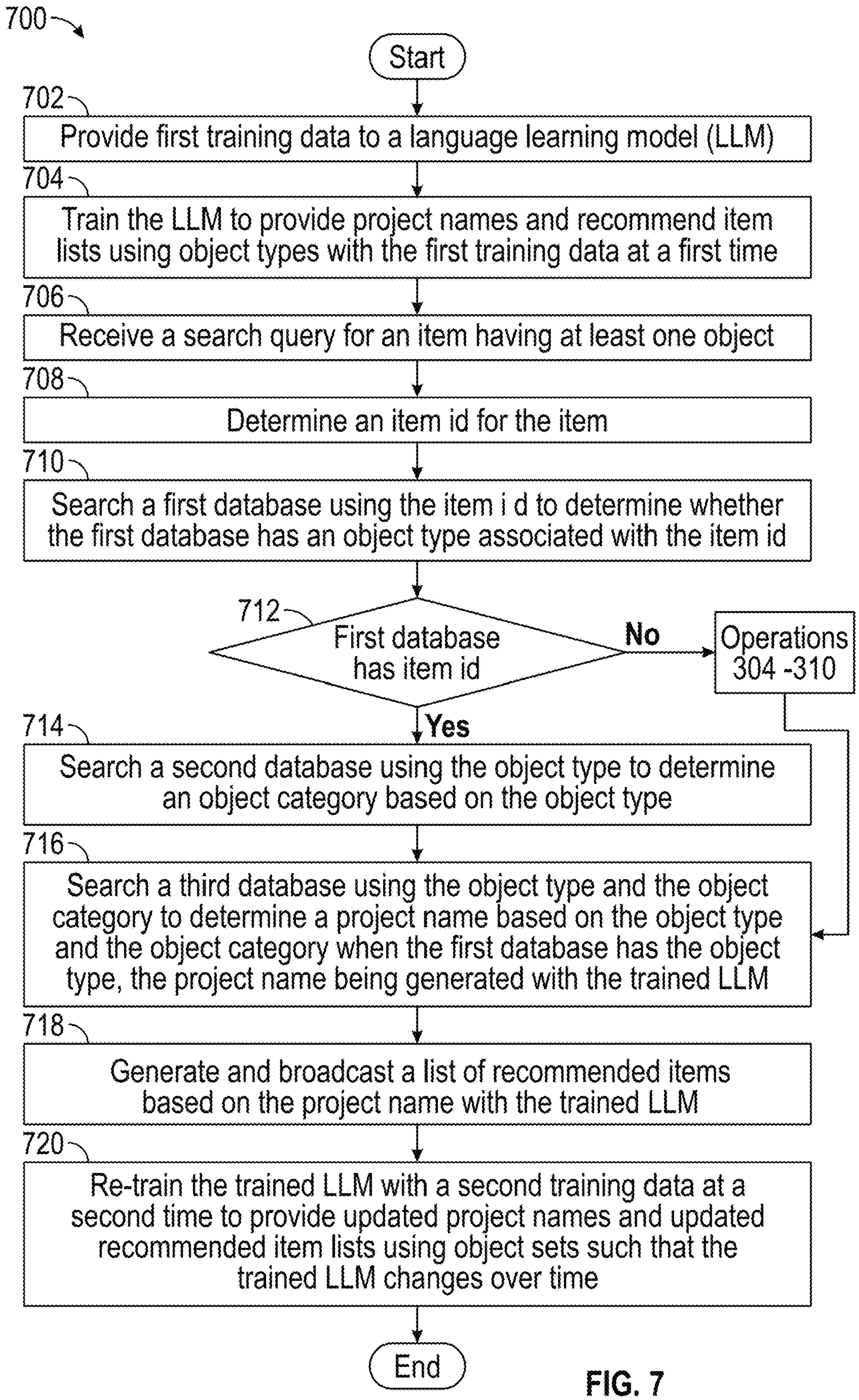
FIG. 7 shows a method for recommending items to a user based on a search query, according to some examples.

During an operation 302, a listing for an item having objects can be received. It should be noted that while the method 300 relates to receiving a listing, in further examples, the method 300 can relate to receiving a search query, as will be detailed further below with respect to FIG. 7 and a method 700. The objects can relate to metadata for the item. Thus, the objects can relate to a title of the item and fitment tokens. The fitment tokens can relate to further descriptors of the item.

After receiving the listing, the method 300 can perform an operation 304, where an object type for the item can be determined using at least one of the objects. The object type can relate to a specific classification of a component or accessory. The specific classification can be determined based on a functionality or design of the component or accessory and the compatibility of the component or accessory with other types of components or equipment for which project names have been associated. Thus, the object can relate to a title for the listing, which can be different from an object type that, as will be discussed further on, can be within the title or an item associated with the title. For example, an object can be "rear tires for a 1988 Camaro™ Z28." The object types can be "Camaro™," "rear tires," and "Z28."

The language learning model 114 can be trained to parse the title and determine an object type, referred to herein as the parsed object type, from the parsed title. The language learning model 114 can then be trained to match the parsed object type to item ids at a look-up table stored at a cache, such as the cache stored at the database 200. The parsed object type can be used to determine if an object type exists for the item associated with the listing received at the operation 302. In particular, the language learning model 114 can be provided with first training data that can be used to train the language learning model 114 to parse the listing into individual parsed object types and then use the look-up table to match the parsed object types to different objects by mapping the parsed object types to data within the look-up table. The look-up table can have a predefined listing of object types such that the language learning model 114 can match the parsed object types to one of the object types in the predefined listing. The predefined look-up table can also include a listing of various functionalities of terms, designs associated with terms, and how terms are associated with object types that are compatible with other components or equipment as discussed above. Thus, the language learning model 114 can match the parsed object types to a listing of various functionalities of terms, designs associated with terms, and how terms are associated with object types that are compatible with other components or equipment to determine an object type.

To further illustrate, and referred herein as "the illustration," the method 300 can associate project names with automotive items where a listing having the title "2018 Honda Accord Headlights" can be received during the operation 302. In the illustration, the item can be a headlight assembly and the fitment tokens can relate to a description of the automobile for which the headlight is associated, such as 2018 Honda Accord, where the terms "2018," "Honda," and "Accord" can be fitment tokens. During the operation 304, the language learning model 114 can parse the title into the terms "2018," "Honda," "Accord," and "Headlights." After parsing the title, the language learning model 114 can determine an item id associated with the term "Headlights." The language learning model 114 can then use the item id to determine an object type using the look-up table at the database 200. In the illustration, the language learning model 114 can determine that the object type is "headlight" based on the item id.

Upon determining the object type, the method 300 can perform an operation 306, where a plurality of object types along with a plurality of categories are determined for the object type using the language learning model 114. The language learning model 114 can access the look-up table that matches object types to categories at the database 202. The object types and the categories can be determined in a key pair t:c where "t" can correspond to an object type and "c" can correspond to a category.

There can be scenarios where the object type can encompass different categories. There can also be scenarios where a category of the different categories can encompass different object types. Thus, an object type can relate to a plurality of categories and a category can relate to a plurality of object types. Thus, key pair values for an object type that encompasses different categories can be $t_1:c_1$, $t_1:c_2$, $t_1:c_3$, . . . $t_1:c_n$. Furthermore, if the category includes different object types, the key pair values can be $t_2:c_1$, $t_3:c_1$, . . . $t_n:c_1$. These key pairs can be found when the language learning model 114 does a reverse look-up at the look-up table at the database 202. In particular, the language learning model 114 can match the category "$c_1$" to the different object types "$t_2$" through "$t_n$."

Returning to the illustration, the object type is "headlight." During the operation 306, the language learning model 114 can match the object type "headlight" to the categories "lens," "reflector," "bulb," and "housing" using the look-up table at the database 202. Therefore, the language learning model 114 can establish the following key pairs: "headlight: lens," "headlight: housing," and "headlight: bulb." Moreover, the language learning model 114 can do a reverse look-up as described above and match the category "bulb" to "halogen," "light emitting diode (LED)," and "Xenon" during the operation 306. As such, the language learning model 114 can establish the following key pairs: "bulb: halogen," "bulb: LED," and "bulb: Xenon."

Referring back to FIG. 3 and the method 300, after the operation 306, the method 300 can perform an operation 308, where embedding vectors $\{v_1, v_2, \ldots v_n\}$ for each key pair of the plurality of associated object types and the plurality of categories can be obtained by the machine learning model. The embedding vectors can have a length. Each of the key pairs can correspond to items having titles. The titles can be associated with embedding vectors such that the embedding vectors are based on item titles for each key pair. Thus, embedding vectors can be obtained by obtaining titles for items for each of the key pairs.

Embedding vectors can be obtained for each object type when multiple categories for each object type are determined, such as $t_1:c_1$, $t_1:c_2$, $t_1:c_3$, . . . $t_1:c_n$. Similarly, embedding vectors can be generated for each category when multiple object types for each category are determined, such as $t_1:c_1$, $t_2:c_1$, $t_3:c_1$, . . . $t_n:c_1$. As noted above, the embedding vectors can be based on item titles for each key pair. The item titles can be obtained from the e-commerce server 102 or a database associated with the e-commerce server 102.

During an operation 310, a centroid for the embedding vectors for each key pair can be determined and assigned using non-parametric supervised learning, such as a KNN algorithm with a language learning model. The centroid can correspond to a cluster for each of the key pairs, which can correspond to object types and categories where a plurality of KNN object types can be gathered. An average vector length $v_{avg}$ for the embedding vectors for each key pair can be determined. Thus, during the operation 310, an average vector length for the embedding vectors associated with the key pair $t_1:c_1$ can be determined along with an average vector length for the embedding vectors associated with the key pair $t_1:c_2$ through the key pair $t_1:c_n$. Similarly, an average vector length for the embedding vectors associated with the key pair $t_1:c_1$ can be determined along with an average vector length for the embedding vectors associated with the key pair $t_2:c_1$ through the key pair $t_n:c_1$. The average vector length can be assigned to each key pair and can correspond to a centroid for each key pair. More specifically, the average vector length can correspond to a centroid object type where centroid object types can be assigned to each of the object types and each of the categories.

Returning to the illustration and making reference to FIG. 4, during the operation 308, embedding vectors for key pairs: headlight: lens 400, headlight: housing 402, headlight: bulb 404, bulb: halogen 406, bulb: LED 408, and bulb: xenon 410 are generated by the language learning model 114. The key pair headlight: lens 400 can have the following titles: Honda™ Civic™ Black Headlight Headlamp Driver Side LH Left 412, Honda™ Civic™ Black Headlight Headlamp Passenger Side RH Right 414, and Chevy™ GMC™ C/K 1500 2500 3500 LED DRL Chrome Clear Lens Headlights 416, which can correspond to embedding vectors 412-416.

The key pair headlight: housing 402 can have the following titles: Headlights Left & Right Pair Set Fit For Toyota Tacoma™ Assembly Black 418, Ford Mustang™ Black Housing Headlight Replacement Lamps Pair 420, and Honda™ Civic™ Sedan Coupe Chrome Housing Clear Corner Headlight Headlamp 422, which can correspond to embedding vectors 418-422. The key pair headlight: bulb 404 can have the following titles: 2X D1S DIR Innovited™ Headlight Light Replacement Bulbs 5000K 6000K 8000K 10000K 424, 4× LED Headlight Bulbs High/Low Beam+Fog Light 6500K For Ram™ 1500 426, Toyota™ Camry™ 2007-2014 Combo LED Headlight High Low Beam+Fog Light Bulbs 428, which can correspond to embedding vectors 424-428.

The key pair bulb: halogen 406 can have the following titles: 12 Bulbs GE™ 66246 29 W (40 W Replacement) Soft White Medium Base Light Bulbs Bulk 430, 10Pack-20 Watt Halogen G8 120V T4 Light Bulbs G8 Base Bi-Pin 120 Volt JCD Type 432, and 10 PACK MR16 12V 20 W 20 watts Halogen Lighting Bulb New 434, which can correspond to embedding vectors 430-434. The key pair bulb: LED 408 can have the following titles: H7 LED Headlight Bulbs Kit High/Low Beam 6500K Super Bright White Lights 2× 436, 8 FT Integrated LED Tube Light Bulbs 144 W 6500K LED Shop Light Fixture 8 Foot 438, and GE LED Light Bulbs, 60 Watt, Daylight, A19 Bulbs, Medium Base, Dimmable (12 pack) 440, which can correspond to embedding vectors 436-440. The key pair bulb: xenon 410 can have the following titles: Aliens™ HID Xenon Headlight Conversion Kit 9005 9006 H1 H3 H4 H13 9005 9006 9007 442, 9005 9006 Xenon Halogen Super White LED Combo Headlight Bulbs High Low Beam Kit 444, and 2x D2S D2R Factory OEM HID Xenon Replacement Headlight Bulbs 446, which can correspond to embedding vectors 442-446.

Each of the titles 412-446 can have embedding vectors associated therewith as described above with reference to the operation 308. In the illustration, once the embedding vectors are obtained, a centroid for the embedding vectors for each of the key pairs can be determined during the operation 310 by the language learning model 114. Thus, for the headlight: lens 400 centroids can be determined for the embedding vectors 412-416. Similarly, for the headlight: housing 402 centroids can be determined for the embedding vectors 418-422 and for the headlight: bulb 404 centroids can be determined for the embedding vectors 424-428. In addition, for the bulb: halogen 406 centroids can be determined for the embedding vectors 430-434 and for the bulb: LED centroids can be determined for the embedding vectors 436-440. Moreover, for the bulb: xenon 410 centroids can be determined for the embedding vectors 442-446.

Returning to FIG. 3 and the method 300, after the operation 310, the method 300 can perform an operation 312, where project names can be identified and metadata corresponding to the plurality of object types and the plurality of categories can be generated. During the operation 312, a language learning model can be trained to identify project names and provide items that can be used to complete projects associated with the project names. The language learning model can also be trained to explain a relationship between object types and categories along with outputting data related to each identified project name.

In order to identify project names, the machine learning model can be trained to identify project names based on the object type and the category associated with the object name. The project names can be identified by mapping the metadata of the identified object types to the centroids determined in the operation 310. Moreover, the project names can be identified by mapping the metadata of the identified categories to the centroids determined in the operation 310. The identified project names can be ranked using a ranking algorithm and selected based on the ranking. Moreover, items associated with the identified project names can be ranked and presented based on the ranking.

The language learning model can be trained to identify project names based on the object type and the associated category by being provided with first training data at a first time. The first training data can include object types and categories along with project names associated with the object types and the associated categories. The language learning model can then be trained to map the object types and the categories to the identified centroids using the first training data at the first time. The language learning model can then store the project names associated with the object types and the categories at the database 204.

When project names are identified, the language learning model can be trained to identify items that can be used to complete projects associated with the project names. Similar to identifying the project names, the items can be identified by matching the project names to the object type centroids along with the category centroids determined in the operation 310. In further examples, the language learning model can be trained to access third party sources to determine additional items that can be used to identify items that can be used to complete projects associated with the project names.

The machine learning model can also be trained to explain a relationship between object types and categories by providing information relating to object type along with associated categories to the language learning model during a training process. Moreover, the machine learning model can be trained to generate project names by providing information relating to object type along with associated categories to the language learning model during a training process.

Upon obtaining the project names, determining the items that are associated with the product names, and determining a relationship between the object types and the categories, the language learning model can implement storage of this data at the database 204. In addition, the language learning model can output this information to a requestor of an item from which the object types and the categories were determined. The output can list the items associated with the project names as item recommendations.

Returning to the illustration, during the operation 312 and limiting the discussion to the key pair headlight: lens 400, during the operation 312, the language learning model 114 determines that the key pair headlight: lens 400 corresponds to the project names 500 of Headlight Restoration 502, Headlight Customization 504, Headlight Replacement 506, and Vehicle Maintenance 508 by matching the metadata associated with the key pair headlight: lens 400 to the centroids associated with the key pair headlight: lens 400.

In addition, the language learning model 114 can determine that the items 510 are associated with the Headlight Restoration 502 project name during the operation 312. Here, the items associated with the Headlight Restoration 502 project name can include a headlight restoration kit, a UV protective clear cost, and sanding devices. As such, these items can be used when completing a headlight restoration project.

The language learning model 114 also determines that the items 512 are associated with the Headlight Customization 504 project name during the operation 312. Here, the items associated with the Headlight Customization 502 project name can include a custom headlight housing, LED halo rings, and tinted headlight film. These items can be used when completing a headlight customization project.

Moreover, the language learning model 114 can determine that the items 514 are associated with the Headlight Replacement 506 project name during the operation 312. The items associated with the Headlight Replacement 506 project name can include a replacement headlight assembly, a headlight bulb, and a headlight wiring harness. Therefore, these items can be used when completing a headlight replacement project.

The language learning model 114 can also determine that the items 516 are associated with the Vehicle Maintenance 508 project name during the operation 312. Here, the items associated with the Vehicle Maintenance 508 project name can include a custom headlight alignment tool, headlight cleaning solution, and a microfiber cloth. These items can be used when performing vehicle maintenance. When the language learning model 114 determines that the items 510-516 are associated with the project names 502-508, the language learning model 114 can store a listing of the items 510-516 with the projects 502-508 at the database 204. Thus, when a search query for an item having object types and categories is received, the language learning model 114 can return a listing of one of the items 510-516 if one of the project names 502-508 is determined by the language learning model 114 to be associated with the item in the search query, as will be discussed further below with reference to FIG. 7.

In addition, the language learning model 114 can provide explanations 600-604 for the items 510 during the operation 312. In particular, the language learning model 114 can indicate that headlight restoration kit 606 is a kit having various tools and materials for cleaning, polishing, and restoring a clarity of headlights lens in the explanation 600. The language learning model 114 can also explain that UV protective clear coat 608 can be a coating applied to a headlight lens after restoration of a headlight lens. The explanation can also note that the UV coating can function to protect the headlight lens from UV damage while maintaining a clarity of the headlight lens. The language learning model 114 can indicate that sanding discs 610 can be a set of abrasive discs used to remove oxidized layers and scratches from a headlight lens during a restoration process. During the operation 312, the language learning model 114 can store these project names, items, and explanations at the database 204.

The language learning model 114 can implement the method 300 on a periodic basis. Moreover, the language learning model 114 can implement the method 300 when a determination is made that additional items have been added to the e-commerce server 102 by sellers in order to assign object types and categories to the added items, generate project names, and generate items that can be used for projects associated with the project names. The method 300 can also be performed in real-time, where object types and categories are determined as items are added to the e-commerce server 102.

As noted above, examples relate to a system and method that recommends items to a user based on a search query received from a user. Now making reference to FIG. 7, the method 700 for recommending items to a user based on search query is shown. During an operation 702, the first training data described above can be provided to a language learning model. The language learning model can then be trained with the first training data to provide project names and recommend item lists using object types with the first training during a first time during an operation 704, as previously discussed.

After the language learning model is trained with the first training data, a search query for an item having at least one object can be received during an operation 706. The item can relate to a project associated with a user for which the item can be used. The at least one object can relate to metadata for the item and therefore relate to a title of the item and fitment tokens, as described above with respect to the operation 302.

An operation 708 can then be performed where an object type for the item using the at least one object is determined as described above with reference to the operation 304. In particular, the language learning model 114 can parse the title of the item and determine an item id from the parsed title. The language learning model 114 can then match the item id to item ids at a look-up table stored at a cache, such as the cache stored at the database 200.

At an operation 710, a first database, such as the database 200, having a listing of item ids and object types associated with the item ids can be searched. The item id can be used to determine if an object type exists for the item associated with the search query. During an operation 712, a determination can be made if the first database lists an object type for the item id. If the first database does not list an object type being associated with the item id, the method 700 can perform the operations 304-310.

If the first database lists an object that matches the item id, the method 700 can move to operation 714 where a second database can be searched using the object type to determine an object category as discussed above with reference to the operation 306 and the database 202. Once an object category is determined, a third database can be searched with both the object type and the object category to determine a name of a project associated with the search query received at an operation 716. As detailed above with reference to the operations 310 and 312, project names for various object types and categories can be generated by the language learning model 114 and stored at the database 204. During the operation 716, the database 204 can be searched with the object type found at the first database and the category found at the second database to determine a project name. The language learning model 114 can be trained to generate project names that are stored in the database 204 as discussed above with reference to the operations 308 and 310.

After a project name is determined during the operation 716, a list of recommended items based on the project name can be generated by the language learning model and broadcast during an operation 718. In particular, armed with the project name, the language learning model 114 can access the database 204, which as previously discussed, can store a listing of items that are associated with a project name. For example, if the language learning model 114 determines that the project name is the headlight restoration 502 project, the language learning model 114 can generate and broadcast a listing of items that includes the headlight restoration kit 606, the UV protective clear coat 608, and the sanding discs 610 that relate to the headlight restoration 502 project during the operation 718. Broadcasting can include sending the listing of items to a user and causing the listing to be displayed on a device associated with the user.

In examples, the language learning model 114 can be retrained with second training data at a second time to provide updated project names and updated recommended item lists using object sets such that the language learning model 114 can change over time. To further illustrate, if a determination is made that the list of recommend items is missing items, a determination can be made that the language learning model 114 is not properly parsing the text in the title, which is leading to an improper determination of object types and categories. The improper object types and categories can lead to an incomplete list of project names.

For example, if a search query is different headlight lens assemblies for a 2006 Porsche™ 911™, the project by a user associated with the search for different headlight assemblies could relate to upgrading the headlight assembly for the 2006 Porsche™ 911™ with a headlight assembly for a 2010 Porsche™ 911™. However, the language learning model 114 may not be trained to parse the search query to have the terms "different headlight" and therefore not determine that a potential project name would include updating the headlight assembly for a 2006 Porsche™ 911™ with a headlight assembly for a 2010 Porsche™ 911™ where a headlight assembly for a 2010 Porsche™ 911™ includes LED turn signals while a headlight assembly for a 2006 Porsche™ 911™ includes halogen turn signals. The second training data can include parsing the item to generate the term "different headlight" in order to account for the project relating to upgrading headlight assemblies to newer headlight assemblies.

Figure 8:
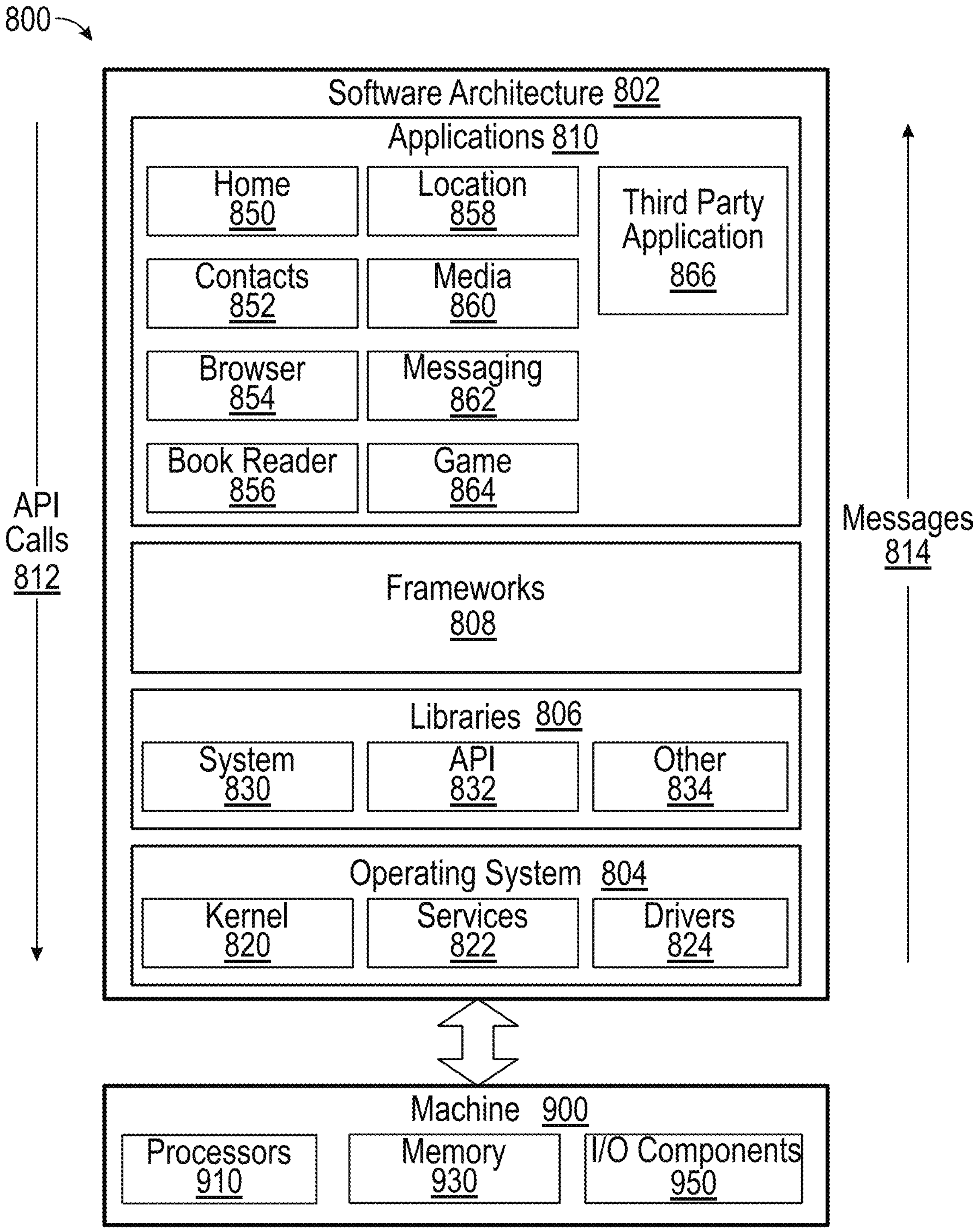
FIG. 8 is a block diagram illustrating architecture of software used to implement social network-initiated listings, according to some examples.
Figure 9:
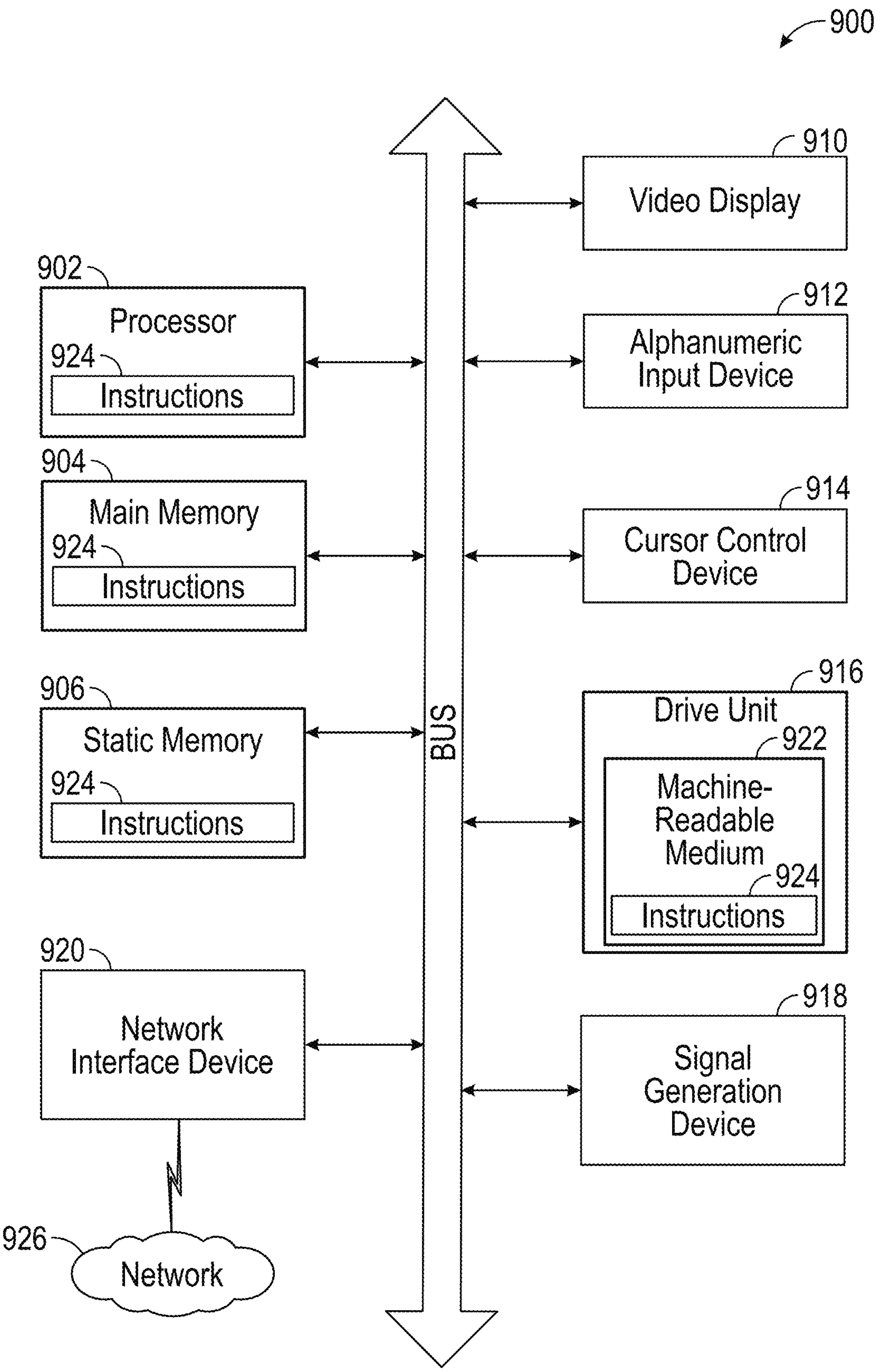
FIG. 9 is a block diagram illustrating a machine as an example computer system with instructions to cause the machine to implement social network-initiated listings, according to some examples.

FIG. 8 is a block diagram 800 illustrating a software architecture 802, which may be installed on any one or more of the devices described above. FIG. 9 is merely a non-limiting example of a software architecture, and it will be appreciated that many other architectures may be implemented to facilitate the functionality described herein. The software architecture 802 may be implemented by hardware such as a computer system 900 of FIG. 13 that includes a processor 902, memory 904 and 906, and I/O components 910-914. In this example, the software architecture 802 may be conceptualized as a stack of layers where each layer may provide a particular functionality. For example, the software architecture 802 includes layers such as an operating system 802, libraries 806, frameworks 808, and applications 810. Operationally, the applications 810 invoke application programming interface (API) calls 812 through the software stack and receive messages 814 in response to the API calls 812, according to some implementations.

In various implementations, the operating system 802 manages hardware resources and provides common services. The operating system 802 includes, for example, a kernel 820, services 822, and drivers 824. The kernel 820 acts as an abstraction layer between the hardware and the other software layers in some implementations. For example, the kernel 820 provides memory management, processor management (e.g., scheduling), component management, networking, and security settings, among other functionality. The services 822 may provide other common services for the other software layers. The drivers 824 may be responsible for controlling or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 806 provide a low-level common infrastructure that may be utilized by the applications 810. The libraries 806 may include system libraries 830 (e.g., C standard library) that may provide functions such as memory allocation functions, string manipulation functions, mathematic functions, and the like. In addition, the libraries 806 may include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 may also include a wide variety of other libraries 834 to provide many other APIs to the applications 810.

The frameworks 808 provide a high-level common infrastructure that may be utilized by the applications 810, according to some implementations. For example, the frameworks 808 provide various graphic user interface (GUI) functions, high-level resource management, high-level location services, and so forth. The frameworks 808 may provide a broad spectrum of other APIs that may be utilized by the applications 810, some of which may be specific to a particular operating system or platform.

In an example, the applications 810 include a home application 850, a contacts application 852, a browser application 854, a book reader application 856, a location application 858, a media application 860, a messaging application 862, a game application 864, and a broad assortment of other applications such as a third-party application 866. According to some examples, the applications 810 are programs that execute functions defined in the programs. Various programming languages may be employed to create one or more of the applications 810, structured in a variety of manners, such as object-orientated programming languages (e.g., Objective-C, Java, or C++) or procedural programming languages (e.g., C or assembly language). In a specific example, the third-party application 866 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 866 may invoke the API calls 812 provided by the mobile operating system (e.g., the operating system 802) to facilitate functionality described herein.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term “hardware-implemented module” should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via the network 112 (e.g., the Internet) and via one or more appropriate interfaces (e.g., application program interfaces (APIs).)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

FIG. 13 is a block diagram of a machine within which instructions may be executed for causing the machine to perform any one or more of the methodologies discussed herein. In one example, the machine may be any of the devices described above. In alternative examples, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device (cursor control device) 1314 (e.g., a mouse), a disk drive unit 916, a signal generation device 918 (e.g., a speaker) and a network interface device 920.

The drive unit 916 includes a machine-readable medium 922 on which is stored one or more sets of instructions and data structures (e.g., software) 1324 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. Instructions 924 may also reside within the static memory 906.

While the machine-readable medium 922 is shown in an example to be a single medium, the term "machine-readable medium" may include a single medium or multiple media (e.g., a centralized or distributed database, and/or associated caches and servers) that store the one or more instructions or data instructions 924. The term "machine-readable medium" shall also be taken to include any tangible medium that is capable of storing, encoding or carrying instructions 924 for execution by the machine and that cause the machine to perform any one or more of the methodologies of the present invention, or that is capable of storing, encoding or carrying data structures utilized by or associated with such instructions 924. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 924 may further be transmitted or received over the network 112 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding or carrying instructions 924 for execution by the machine, and includes digital or analog communications signals or other intangible media to facilitate communication of such software.

In various example examples, one or more portions of the network 112 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 112 or a portion of the network 112 may include a wireless or cellular network, and a coupling may be a Code Division Multiple Access (CDMA) connection, a Global System for Mobile communications (GSM) connection, or another type of cellular or wireless coupling. In this example, a coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology. Although an example has been described with reference to specific examples, it will be evident that various modifications and changes may be made to these examples without departing from the broader spirit and scope of the invention. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

The instructions may be transmitted or received over the network using a transmission medium via a network interface device (e.g., a network interface component included in the communication components) and utilizing any one of a number of well-known transfer protocols (e.g., hypertext transfer protocol (HTTP)). Similarly, the instructions may be transmitted or received using a transmission medium via the coupling (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," "device-readable medium," and "machine storage medium," mean the same thing and may be used interchangeably in this disclosure. The terms are defined to include both machine-storage media and transmission media. Thus, the terms include both storage devices/media and carrier waves/modulated data signals. For instance, an embodiment described herein can be implemented using a non-transitory medium (e.g., a non-transitory computer-readable medium).

ADDITIONAL EXAMPLES

Example 1 is a system comprising: a processor; and memory comprising instructions that, when executed by the processor, cause the system to perform operations comprising: providing training data to a language learning model (LLM); training the LLM to: provide project names; and recommend item lists using object sets with the training data at a first time; receiving a search query for an item having at least one object; determining an item identification (id) object type for the item using the at least one object; accessing a first database using the item id object type to determine whether the first database has an object type category based on the item id object type, the first database having item ids object types associated with object types categories; searching a second database using the object type category to determine a project name based on the object type category when the first database has the object type category, the project name being generated using the trained LLM; and generating, using the trained LLM, a list of recommended items based on the project name.

Example 2 is (Using k-nearest neighbor algorithm when the first database does not have object type) The system of Example 1, wherein when the second first database does not have the object type, the instructions further cause the system to perform operations comprising: gathering a plurality of k-nearest neighbor algorithm (KNN) object types; determining a plurality of vectors associated with the plurality of KNN object types, each KNN object type of the plurality of KNN object types having a vector of the plurality of vectors; and determining an average vector for each of the plurality of vectors.

In Example 3, the subject matter of Example 2 includes, wherein the instructions further cause the system to perform operations comprising assigning a centroid of the KNN object types based on the average vector, the centroid being associated with a centroid object type; and assigning, by the trained LLM, the centroid object type to the object category.

Example 4 is (Background process to assign object types as sellers upload items to eBay) The system of Example 1, wherein the instructions further cause the system to perform operations comprising: determining that additional items have been added to a network platform; and assigning, by the trained LLM, additional object types to the additional items as the additional items are added to the network platform.

Example 5 is (Background process to assign object types for items that sellers have already uploaded to eBay) The system of Example 1, wherein the instructions further cause the system to perform operations comprising: determining that additional items added to a network platform lack additional object types; and assigning, by the trained LLM, additional object types to the additional items.

In Example 6, the subject matter of Examples 1-5 includes, wherein the instructions further cause the system to perform operations comprising: ranking the list of the recommended items; and presenting the list of recommended items according to the ranking.

In Example 7, the subject matter of Examples 1-6 includes, wherein the instructions further cause the system to perform operations comprising: generating, by the LLM, a plurality of related types associated with the project names during the training of the LLM; and generating, by the trained LLM, an explanation of each related type of the plurality of related types.

Example 8 is a non-transitory machine storage medium having instructions embodied thereon, the instructions executable by a processor of a machine to perform operations comprising: providing training data to a language learning model (LLM); training the LLM to: provide project names; and recommend item lists using object sets with the training data at a first time; receiving a search query for an item having at least one object; determining an item identification (id) for the item using the at least one object; accessing a first database using the item id to determine whether the first database has an object type based on the item id, the first database having item ids associated with object types; searching a second database using the object type to determine a project name based on the object type when the first database has the object type, the project name being generated using the trained LLM; and generating, using the trained LLM, a list of recommended items based on the project name.

In Example 9, the subject matter of Example 8 includes, wherein when the second database does not have the object type the operations further comprise: gathering a plurality of k-nearest neighbor algorithm (KNN) object types; determining a plurality of vectors associated with the plurality of KNN object types, each KNN object type of the plurality of KNN object types having a vector of the plurality of vectors; and determining an average vector for each of the plurality of vectors.

In Example 10, the subject matter of Example 9 includes, the operations further comprising assigning a centroid of the KNN object types based on the average vector, the centroid being associated with a centroid object type.

In Example 11, the subject matter of Examples 8-10 includes, the operations further comprising: determining that additional items have been added to a network platform; and assigning, by the trained LLM, additional object types to the additional items as the additional items are added to the network platform.

In Example 12, the subject matter of Examples 8-11 includes, the operations further comprising: determining that additional items added to a network platform lack additional object types; and assigning, by the trained LLM, additional object types to the additional items.

In Example 13, the subject matter of Examples 8-12 includes, the operations further comprising: ranking the list of the recommended items; and presenting the list of recommended items according to the ranking.

In Example 14, the subject matter of Examples 8-13 includes, the operations further comprising: generating, by the LLM, a plurality of related types associated with the project names during the training of the LLM; and generating, by the trained LLM, an explanation of each related type of the plurality of related types.

Example 15 is a method comprising: providing training data to a language learning model (LLM); training the LLM to: provide project names; and recommend item lists using object sets with the training data at a first time; receiving a search query for an item having at least one object; determining an item identification (id) for the item using the at least one object; accessing a first database using the item id to determine whether the first database has an object type based on the item id, the first database having item ids associated with object types; searching a second database using the object type to determine a project name based on the object type when the first database has the object type, the project name being generated using the trained LLM; and generating, using the trained LLM, a list of recommended items based on the project name.

In Example 16, the subject matter of Example 15 includes, wherein when the second database does not have the object type the method further comprises: gathering a plurality of k-nearest neighbor algorithm (KNN) object types; determining a plurality of vectors associated with the plurality of KNN object types, each KNN object type of the plurality of KNN object types having a vector of the plurality of vectors; determining an average vector for each of the plurality of vectors; and assigning a centroid of the KNN object types based on the average vector, the centroid being associated with a centroid object type.

In Example 17, the subject matter of Examples 15-16 includes, the method further comprising: determining that additional items have been added to a network platform; and assigning, by the trained LLM, additional object types to the additional items as the additional items are added to the network platform.

In Example 18, the subject matter of Examples 15-17 includes, the method further comprising: determining that additional items added to a network platform lack additional object types; and assigning, by the trained LLM, additional object types to the additional items.

In Example 19, the subject matter of Examples 15-18 includes, the method further comprising: ranking the list of the recommended items; and presenting the list of recommended items according to the ranking.

In Example 20, the subject matter of Examples 15-19 includes, the method further comprising: generating, by the LLM, a plurality of related types associated with the project names during the training of the LLM; and generating, by the trained LLM, an explanation of each related type of the plurality of related types.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more," or the like. The presence of broadening words and phrases such as "one or more," "at least," "but not limited to," or other like phrases in some instances shall not be read to mean that the narrower case is intended or required in instances where such broadening phrases may be absent. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense. It will be understood that changes and modifications may be made to the disclosed embodiments without departing from the scope of the present disclosure. These and other changes or modifications are intended to be included within the scope of the present disclosure.

What is claimed is:

1. A system comprising:

a processor; and memory comprising instructions that, when executed by the processor, cause the system to perform operations comprising:

obtaining a trained language learning model (LLM), the trained LLM being trained based on training data;

receiving a search query from a client device for an item listed on an online platform, the item having at least one object;

determining an item identification (id) for the item listed on the online platform using the at least one object;

searching a first source to determine whether the first source has an object type based on the item id, the first source having item identifications (ids) associated with object types;

based on determining that the first source has the object type, searching a second source using the object type to determine a project name based on the object type, wherein the project name is generated using the trained LLM;

generating, using the trained LLM, a list of recommended items based on the project name; and causing presentation of the list of recommended items on the client device.

2. The system of claim 1, wherein when the second source does not have the object type, the instructions further cause the system to perform operations comprising:
gathering a plurality of k-nearest neighbor algorithm (KNN) object types;
determining a plurality of vectors associated with the plurality of KNN object types, each KNN object type of the plurality of KNN object types having a vector of the plurality of vectors,
determining an average vector for each of the plurality of vectors.

3. The system of claim 2, wherein the instructions further cause the system to perform operations comprising:
assigning a centroid of the plurality of KNN object types based on the average vector, the centroid being associated with a centroid object type; and
determining the project name with the centroid.

4. The system of claim 1, wherein the instructions further cause the system to perform operations comprising:
determining that additional items have been added to a network platform; and
assigning, by the trained LLM, additional object types to the additional items as the additional items are added to the network platform.

5. The system of claim 1, wherein the instructions further cause the system to perform operations comprising:
determining that additional items added to a network platform lack additional object types; and
assigning, by the trained LLM, additional object types to the additional items.

6. The system of claim 1, wherein the instructions further cause the system to perform operations comprising:
ranking the list of the recommended items; and
presenting the list of recommended items according to the ranking.

7. The system of claim 1, wherein the instructions further cause the system to perform operations comprising:
generating, by the trained LLM, a plurality of related types associated with the project name; and
generating, by the trained LLM, an explanation of each related type of the plurality of related types.

8. A non-transitory machine storage medium having instructions embodied thereon, the instructions executable by a processor of a machine to perform operations comprising:
obtaining a trained language learning model (LLM), the trained LLM being trained based on training data;
receiving a search query from a client device for an item listed on an online platform, the item having at least one object;
determining an item identification (id) for the item listed on the online platform using the at least one object;
searching a first source to determine whether the first source has an object type based on the item id, the first source having item identifications (ids) associated with object types;
based on determining that the first source has the object type, searching a second source using the object type to determine a project name based on the object type, wherein the project name is generated using the trained LLM;
generating, using the trained LLM, a list of recommended items based on the project name; and
causing presentation of the list of recommended items on the client device.

9. The non-transitory machine storage medium of claim 8, wherein when the second source does not have the object type the operations further comprise:
gathering a plurality of k-nearest neighbor algorithm (KNN) object types;
determining a plurality of vectors associated with the plurality of KNN object types, each KNN object type of the plurality of KNN object types having a vector of the plurality of vectors; and
determining an average vector for each of the plurality of vectors.

10. The non-transitory machine storage medium of claim 9, the operations further comprising:
assigning a centroid of the plurality of KNN object types based on the average vector, the centroid being associated with a centroid object type; and
determining the project name with the centroid.

11. The non-transitory machine storage medium of claim 8, the operations further comprising:
determining that additional items have been added to a network platform; and
assigning, by the trained LLM, additional object types to the additional items as the additional items are added to the network platform.

12. The non-transitory machine storage medium of claim 8, the operations further comprising:
determining that additional items added to a network platform lack additional object types; and
assigning, by the trained LLM, additional object types to the additional items.

13. The non-transitory machine storage medium of claim 8, the operations further comprising:
ranking the list of the recommended items; and
presenting the list of recommended items according to the ranking.

14. The non-transitory machine storage medium of claim 8, the operations further comprising:
generating, by the trained LLM, a plurality of related types associated with the project names; and
generating, by the trained LLM, an explanation of each related type of the plurality of related types.

15. A method comprising:
obtaining a trained language learning model (LLM), the trained LLM being trained based on training data;
receiving a search query from a client device for an item listed on an online platform, the item having at least one object;
determining an item identification (id) for the item listed on the online platform using the at least one object;
searching a first source to determine whether the first source has an object type based on the item id, the first source having item identifications (ids) associated with object types;
based on determining that the first source has the object type, searching a second source using the object type to determine a project name based on the object type, wherein the project name is generated using the trained LLM;
generating, using the trained LLM, a list of recommended items based on the project name; and
causing presentation of the list of recommended items on the client device.

16. The method of claim 15, wherein when the second source does not have the object type the method further comprises:
gathering a plurality of k-nearest neighbor algorithm (KNN) object types;

determining a plurality of vectors associated with the plurality of KNN object types, each KNN object type of the plurality of KNN object types having a vector of the plurality of vectors;

determining an average vector for each of the plurality of vectors;

assigning a centroid of the plurality of KNN object types based on the average vector, the centroid being associated with a centroid object type; and determining the project name with the centroid.

17. The method of claim 15, the method further comprising:

determining that additional items have been added to a network platform; and assigning, by the trained LLM, additional object types to the additional items as the additional items are added to the network platform.

18. The method of claim 15, the method further comprising:

determining that additional items added to a network platform lack additional object types; and assigning, by the trained LLM, additional object types to the additional items.

19. The method of claim 15, the method further comprising:

ranking the list of the recommended items; and presenting the list of recommended items according to the ranking.

20. The method of claim 15, the method further comprising:

generating, by the trained LLM, a plurality of related types associated with the project names; and generating, by the trained LLM, an explanation of each related type of the plurality of related types.

* * * * *